(12) United States Patent
Tsuchiya et al.

(10) Patent No.: US 10,027,364 B2
(45) Date of Patent: Jul. 17, 2018

(54) DIFFERENTIAL COMMUNICATION CIRCUIT

(71) Applicant: DENSO CORPORATION, Kariya, Aichi-pref. (JP)

(72) Inventors: Naoya Tsuchiya, Kariya (JP); Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/663,888

(22) Filed: Jul. 31, 2017

(65) Prior Publication Data

US 2018/0041240 A1    Feb. 8, 2018

(30) Foreign Application Priority Data

Aug. 2, 2016   (JP) .................................. 2016-151928

(51) Int. Cl.
   *H04B 1/40*   (2015.01)

(52) U.S. Cl.
   CPC ...................... *H04B 1/40* (2013.01)

(58) Field of Classification Search
   USPC .............................. 375/219, 218; 326/82, 83
   See application file for complete search history.

(56) References Cited

U.S. PATENT DOCUMENTS

| 7,746,921 | B1* | 6/2010 | Wik | ..................... H03K 17/693 327/108 |
| 9,223,736 | B2 | 12/2015 | de Haas | |
| 2007/0042722 | A1* | 2/2007 | Kim | ......................... H04L 5/16 455/73 |
| 2008/0001632 | A1* | 1/2008 | Lee | ..................... H03K 19/0013 326/83 |
| 2008/0238482 | A1* | 10/2008 | Tian | .................. H03K 19/00384 326/82 |
| 2012/0001615 | A1* | 1/2012 | Levine | .............. H01L 27/14609 324/71.5 |
| 2013/0163126 | A1* | 6/2013 | Dong | .................. G06F 13/4086 361/56 |
| 2013/0294460 | A1 | 11/2013 | Hell | |

* cited by examiner

*Primary Examiner* — Eva Puente
(74) *Attorney, Agent, or Firm* — Posz Law Group, PLC

(57) ABSTRACT

A differential communication circuit includes: a first switch in between a signal line and a power source, a second switch in between a signal line and a ground, a third switch in between the signal line and the ground, a fourth switch in between the signal line and the power source, first and second drivers respectively driving the first and second switches, and third and fourth drivers respectively driving the third and fourth switches OFF to ON at an ON to OFF timing of the first and second switches, for setting an ON period of the third and fourth switches to be shorter than a one-bit width in a communication signal and enabling a stable signal level determination while reducing power consumption of the differential communication circuit.

9 Claims, 9 Drawing Sheets

| NOTATION | VALUE | | |
|---|---|---|---|
| | Min(V) | Nom(V) | Max(V) |
| VH | +2.0 | +2.5 | +3.0 |
| VL | +2.0 | +2.5 | +3.0 |
| $V_{diff}$ | −0.5 | 0 | +0.05 |

DIFFERENTIAL COMMUNICATION CIRCUIT

CROSS REFERENCE TO RELATED APPLICATION

The present application is based on and claims the benefit of priority of Japanese Patent Application No. 2016-151928, filed on Aug. 2, 2016, the disclosure of which is incorporated herein by reference.

TECHNICAL FIELD

The present disclosure generally relates to a differential communication circuit that transmits a differential signal.

BACKGROUND INFORMATION

The differential communication circuit is a circuit that is configured to switch the transmission signal to a HIGH state or to a LOW state based on a potential difference between a pair of signal lines that serve as bus lines. In such a differential communication circuit, a high impedance caused by a bus switching from a drive state to a non-drive state generates a ringing, and an otherwise zero potential difference may be falsely detected as exceeding a signal level threshold, and may lead to an unstable signal level determination.

As disclosed in a patent document 1 listed below, a device uses a bus to drive a first and second switch by applying a forward voltage during an ON period, and drives a third and fourth switch using a reverse voltage during an OFF period of the first and second switches. In such manner, when the first/second switches turn from ON to OFF, the bus has a negative potential difference, thereby preventing an over-threshold signal level even when ringing is caused, and enabling a stable signal level determination.

(Patent Document 1) U.S. Pat. No. 9,223,736

The device in patent document 1 supplies a drive current to the bus during the entire OFF period of the first/second switches by turning the third/fourth switches to ON, which causes an increase in power consumption.

While differential circuits are suitable for their intended use, they are subject to improvement. For example, current differential circuits may consume unnecessary power during their use. The present teachings provide embodiments of differential circuits that address such shortcomings in the art and provide numerous advantages as well.

SUMMARY

It is an object of the present disclosure to provide a differential communication circuit that reduces power consumption while enabling a stable signal level determination.

In an aspect of the present disclosure, the differential communication circuit may switch a potential of each signal line in a pair of signal lines according to a transmission signal to generate a potential difference between the signal lines, and may include: a first switch, a second switch, a third switch, a fourth switch, a first and second main driver circuits, and a first and second sub-driver circuits.

The first switch may be disposed at a position between a first signal line and a first potential. The second switch may be disposed at a position between a second signal line and a second potential, with the second potential set to be lower than the first potential. The third switch may be disposed at a position between the first signal line and the second potential. The fourth switch may be disposed at a position between the second signal line and the first potential. The first main driver circuit is configured to drive the first switch and the second main driver circuit is configured to drive the second switch. The first sub-driver circuit is configured to drive the fourth switch, and the second sub-driver is configured to drive the third switch, with the third switch and the fourth switch driven from an OFF state to an ON state when the first switch and the second switch are switched from an ON state to an OFF state by the respective first and second main driver circuits, with the ON periods of the third and fourth switches set to be shorter than a shortest of a preset shortest OFF period of either of the first and second switches.

According to the present disclosure, when driving the first and second switches from ON to OFF, the third and fourth switches are turned ON for a period that is shorter than an OFF period of the first and second switches, i.e., a period that is shorter than the shortest OFF period of either of the first switch or the second switch. As a result, a negative potential difference is generated between the pair of signal lines. A positive potential difference is generated between the pair of signal lines during the ON period of the first and second switches. Ringing occurs immediately after the first and second switches are switched from ON to OFF, and the ringing attenuates, i.e., is damped, in a short period. Therefore, the negative potential difference is generated for a short period to enable a stable signal level determination. That is, as long as a negative potential difference period continues, at least for a duration of the ringing, even if the negative potential difference returns to zero in a very short period, it is sufficient for enabling a stable signal level determination.

Further, by setting an ON period of the third and fourth switches to be shorter than an OFF period of the first and second switches, the power consumption is reduced. That is, according to the present disclosure, the power consumption of the differential communication circuit is reduced in the above-described manner while enabling the stable signal level determination.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure for implementation are described, with reference to the drawings. The communication system according to each of the following embodiments assumes a system which transmits and receives a differential signal via a bus 10 that is commonly used by a plurality of ECUs 100. Communication between the ECUs 100 may be by a communication protocol, for example, the Controller Area Network with Flexible Data-rate ("CAN FD") protocol. In the above, CAN is a registered trademark.

First Embodiment

<1-1. Communication System>

Figure 1:
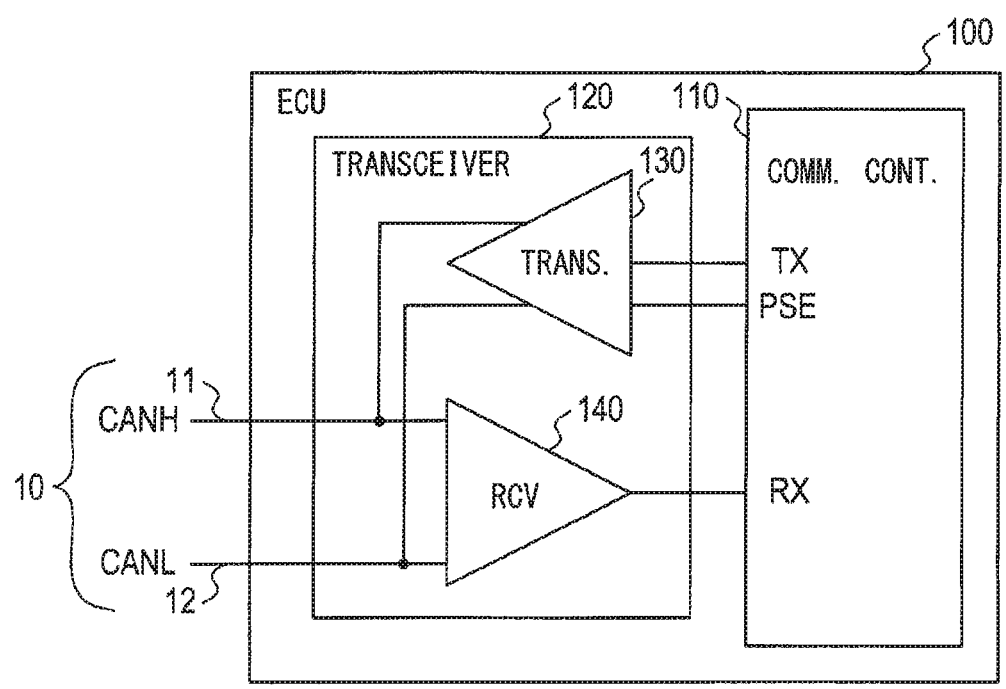
FIG. 1 illustrates a circuit configuration diagram of an electric control unit (ECU)

The configuration of communication systems is described with reference to FIG. 1. Although not illustrated, each of the ECUs 100 may be connected to a plurality of branch lines, respectively, which may branch from a trunk line of the bus 10. That is, each of the ECUs 100 may act as a node on a bus network.

The differential signal received from and transmitted to the bus 100 by each of the ECUs 100 includes a signal sequence of bits, for example a binary code stream, with each bit having either a dominant value or a recessive value.

The bus 10 is a communication channel (also referred to herein as a "communication path") that includes a pair of wires, for example, a signal line 11 and a signal line 12. Both ends of the signal line 11 are connected to both ends of the signal line 12 via respective terminators. For example, one end of signal line 11 is connected to one end of the signal line 12 via a terminator, and the other end of signal line 11 is connected to the other end of signal line 12 via a terminator. Depending on the polarity of the potential difference between the signal line 11 and the signal line 12, that is, whether the potential difference is positive or negative, a transmission signal TX may be designated as either dominant or recessive. As used in the exemplary embodiments and illustrated in the drawings, a potential of the signal line 11 is represented as VH, and a potential of the signal line 12 is represented as VL. As used herein, "potential" is understood as an electrical potential and may be used interchangeably with voltage and voltage level.

Each of the ECUs 100 has the same circuit configuration, and is provided with a communication controller 110 and a transceiver 120.

The communication controller 110 is an information processor that is provided with a CPU, a ROM, a RAM, etc. for performing communications control. The communication controller 110 may include a microcontroller that functions, for example, like a computer system. The communication controller 110 is provided with a TX terminal, a PSE terminal, and an RX terminal, as communication terminals. These terminals of the communication controller 110 are connected to the communication terminals (not shown) of the transceiver 120.

The transceiver 120 is a device that functions as an interface between the bus 10 and the communication controller 110, and is provided with a transmitter 130 and a receiver 140.

The transmitter 130 converts the transmission signal TX output from the TX terminal of the communication controller 110 into a differential signal voltage Vdiff which is a potential difference between the signal line 11 and the signal line 12, and transmits Vdiff to the bus 10. In other words, the differential signal voltage is the difference between the VH potential and the VL potential, that is, Vdiff=VH−VL, with the potential VL of the signal line 12 serving as the reference potential.

When the transmission signal TX is dominant, the transmitter 130 controls the bus 10 so that the differential signal Vdiff takes a positive value. On the other hand, when the transmission signal TX is recessive, the transmitter 130 controls the bus 10 so that the differential signal Vdiff takes a negative value, i.e., a value below zero. The differential signal Vdiff is transmitted to the receiver 140 of other ECUs 100 via the bus 10. In the present embodiment, an H level of the transmission signal TX is designated as dominant, and an L level of the transmission signal TX is designated as recessive.

The details of the circuit configuration of the transmitter 130 are described in further detail below.

The receiver 140 is a circuit that includes a comparator. The receiver 140 receives the differential signal voltage Vdiff, compares the differential signal voltage Vdiff with a threshold voltage Vthr, and determines whether the received differential signal voltage Vdiff is dominant or recessive. In the present embodiment, the threshold Vthr is set to 0.7 V.

The RX terminal of the communication controller 110 controls the output of the reception signal RX from the receiver 140. The reception signal RX is a binary code signal that may correspond to either a dominant state or a recessive state.

<1-2. Transmitter>

Figure 2:
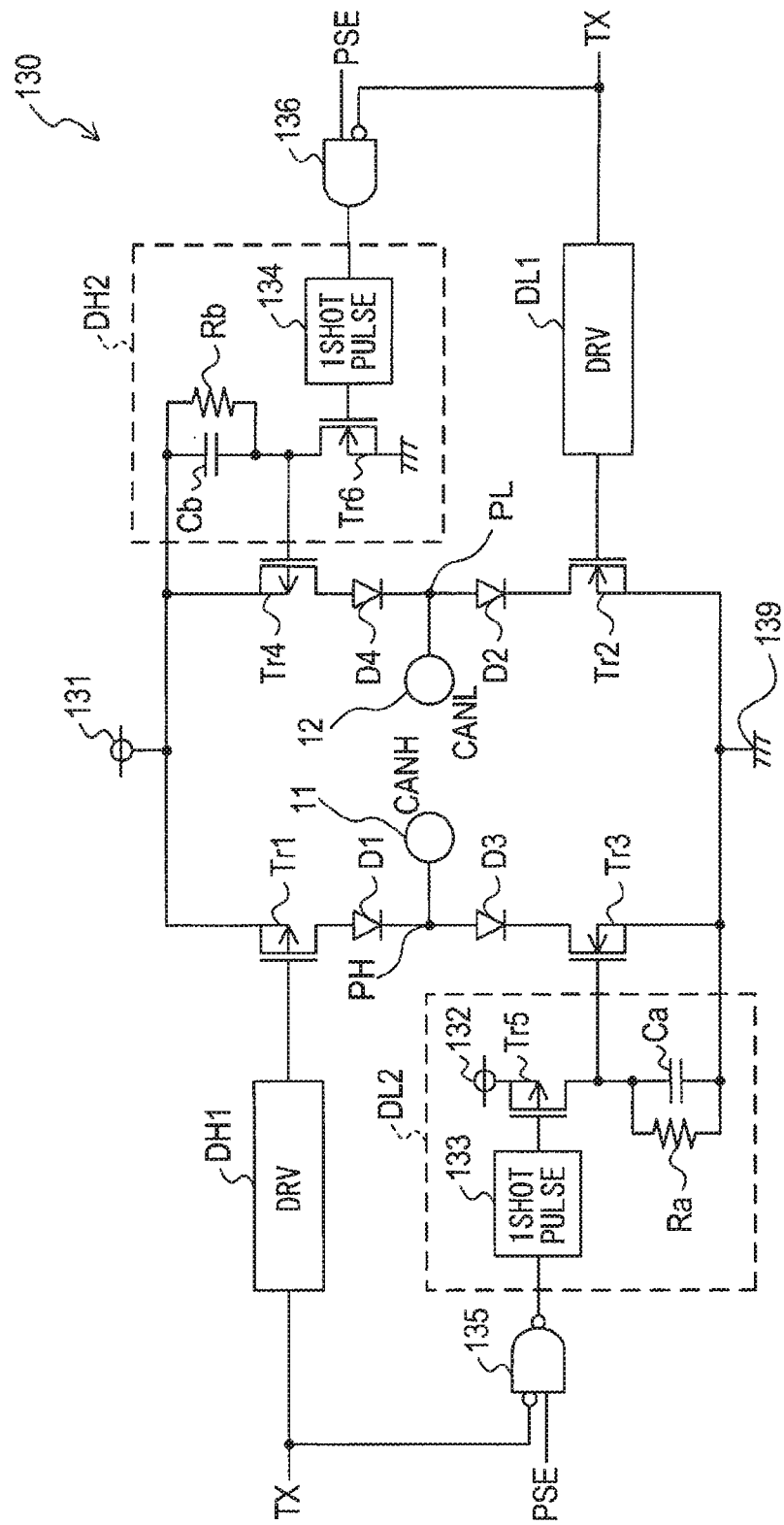
FIG. 2 illustrates a configuration diagram of a transmitter in a first embodiment of the present disclosure.

Next, the circuit configuration of the transmitter 130 is described with reference to FIG. 2. The transmitter 130 is provided with switches Tr1-Tr4, diodes D1-D4, drivers DH1, DL1, DH2, DL2, a power supply 131, and logic circuits 135, 136.

The switches Tr1 and Tr4 are, for example, PMOS-type transistors, i.e., p-type MOSFETs, and the switches Tr2 and Tr3 are, for example, NMOS-type transistors, i.e., n-type MOSFETs. That is, the switches Tr1-Tr4 are voltage control type transistors that use a gate terminal as the control terminal.

The switch Tr1, the diode D1, the diode D3, and the switch Tr3 are connected in series. More practically, a drain terminal of the switch Tr1 and an anode terminal of the diode D1 are connected, and a cathode terminal of the diode D1 and an anode terminal of the diode D3 are connected. Further, a cathode terminal of the diode D3 and a drain terminal of the switch Tr3 are connected.

Likewise, the switch Tr4, the diode D4, the diode D2 and the switch Tr2 are connected in series. More practically, a drain terminal of the switch Tr4 and an anode terminal of the diode D4 are connected, and a cathode terminal of the diode D4 and an anode terminal of the diode D2 are connected.

Further, a cathode terminal of the diode D2 and a drain terminal of the switch Tr2 are connected.

A source terminal of the switch Tr1 and a source terminal of the switch Tr4 are connected to the power supply 131. In the present embodiment, the power supply 131 is, for example, a direct current power supply of 5 V.

A source terminal of the switch Tr3 and a source terminal of the switch Tr2 are connected to a ground 139. That is, the source terminals of the switches Tr3 and Tr2 are grounded.

Further, a junction point PH between the diode D1 and the diode D3 is connected to the signal line 11, and a junction point PL between the diode D4 and the diode D2 is connected to the signal line 12. That is, the potential difference between the junction point PH and the junction point PL serves as the differential signal voltage Vdiff.

The driver DH1 is a driver circuit which is connected to a gate terminal of the switch Tr1, and drives the switch Tr1 by receiving an input of the transmission signal TX. More practically, the driver DH1 does not apply voltage to the gate terminal of the switch Tr1 when the transmission signal TX is in the H level, but applies voltage to the gate terminal of the switch Tr1 when the transmission signal TX is in the L level. That is, the switch Tr1 is in an ON state (i.e., is turned ON) when the transmission signal TX is dominant, and is in an OFF state (i.e., is turned OFF) when the transmission signal TX is recessive.

The driver DL1 is a driver circuit which is connected to a gate terminal of the switch Tr2, and drives the switch Tr1 by receiving an input of the transmission signal TX. More practically, the driver DL1 applies voltage to the gate terminal of the switch Tr2 when the transmission signal TX in the H level, and does not apply voltage to the gate terminal of the switch Tr2 when the transmission signal TX in the L level. That is, just like the switch Tr1, the switch Tr2 is in the ON state (i.e., is turned ON) when the transmission signal TX is dominant, and is in the OFF state (i.e., is turned OFF) when the transmission signal TX is recessive.

The logic circuits 135 are 136 are, respectively, a circuit which receives an input of (i) the transmission signal TX and (ii) a phase PSE of a communication frame. The communication frame of the CAN FD protocol comprises two phases, i.e., an arbitration phase and a data phase.

The arbitration phase is set to have a bit rate equivalent to that of the conventional CAN (e.g., 500 kbit/s). On the other hand, the data phase is set to have a maximum bit rate of, for example, 5 Mbit/s, which is higher than the arbitration phase.

In the arbitration phase, when the transmission signals TX from the plurality of ECUs 100 collide, an arbitration is performed, and, in the data phase, the transmission signal TX from an ECU 100 winning the arbitration is transmitted.

In the present embodiment, an L level, i.e., a low level, of the phase PSE serves as an arbitration phase, and an H level, i.e., a high level, of the phase PSE serves as a data phase.

In the logic circuit 135, when the transmission signal TX is in the L level and the phase PSE is in the H level, an output of the logic circuit 135 takes the L level, otherwise an output of the logic circuit 135 takes the H level. That is, the logic circuit 135 outputs the L level signal only when the output is in the data phase and is represented as recessive.

On the other hand, in the logic circuit 136, when the transmission signal TX is in the L level and the phase PSE in the H level, an output from the logic circuit 136 takes the H level, otherwise an output from the logic circuit 136 takes the L level.

The driver DL2 is a driver circuit which receives an output of the logic circuit 135, and drives the switch Tr3.

The driver DL2 is provided with a switch Tr5, a resistor Ra, a capacitor Ca, a power supply 132, and a pulse generator 133.

The switch Tr5 is a PMOS-type transistor, and has a source terminal connected to the power supply 132. In the present embodiment, the power supply 132 is, for example, a direct current (DC) power supply of 5 V.

The resistor Ra and the capacitor Ca in combination serve as an RC parallel circuit, and the RC parallel circuit is connected at a position between a drain terminal of the switch Tr5 and the ground 139. A junction point between the switch Tr5 and the RC parallel circuit is connected to a gate terminal of the switch Tr3. Further, the pulse generator 133 is connected to a position between a gate terminal of the switch Tr5 and an output terminal of the logic circuit 135.

When the output of the logic circuit 135 is in the H level, the pulse generator 133 applies the voltage of 5 V to the gate terminal of the switch Tr5, and, when the output of the logic circuit 135 is in the L level, the pulse generator 133 outputs a 0 V pulse of a preset time (i.e., a pulse with a pulse width corresponding to the preset time) to the gate terminal of the switch Tr5. That is, the pulse generator 133 does not apply, i.e., stops an application of, voltage to the gate terminal of the switch Tr5 only for the preset time (i.e. pulse width), when the output of the logic circuit 135 is in the L level.

Therefore, in a recessive period of the data phase, the switch Tr5 is in the ON state only for a pulse width of a 0 V pulse, thereby causing the ON state of the switch Tr3. The preset time may be the pulse width in terms of a "bit," or some division/multiple thereof. For example, a pulse width less than a bit, or ⅓ of a bit, and the like.

The driver DH2 is a driver circuit which drives the switch Tr4 by receiving an output of the logic circuit 136. The driver DH2 is provided with a switch Tr6, a resistor Rb, a capacitor Cb, and a pulse generator 134.

The switch Tr6 is an NMOS-type transistor having a grounded source terminal.

The resistor Rb and the capacitor Cb in combination serve as an RC parallel circuit, and the RC parallel circuit is connected to a position between the power supply 131 and a drain terminal of the switch Tr6.

A junction point between the switch Tr6 and the RC parallel circuit is connected to a gate terminal of the switch Tr4.

The pulse generator 134 is connected to a position between a gate terminal of the switch Tr6 and an output terminal of the logic circuit 136.

The pulse generator 134 does not apply voltage to the gate terminal of the switch Tr6 when the output of the logic circuit 136 is in the L level, but outputs a pulse of 5 V of a preset time (i.e., pulse width) to the gate terminal of the switch Tr6 when the output of the logic circuit 136 is in the H level.

Therefore, in the recessive period of the data phase, the switch Tr6 is in the ON state during a time (i.e. pulse width) of the 5 V pulse, thereby causing the ON state of the switch Tr4.

In the present embodiment, the transmitter 130 corresponds to a differential communication circuit, and the receiver 140 corresponds to a reception circuit. Further, the signal line 11 corresponds to a first signal line, the signal line 12 corresponds to a second signal line, the switches Tr1-Tr4 correspond respectively to first to fourth switches, and the switches Tr5 and Tr6 correspond to sub-switches. The drivers DH1 and DL1 correspond to main driver circuits, and the drivers DH2 and DL2 correspond to sub-driver circuits. The power supply 131 corresponds to a first potential, and the ground 139 acts as a second potential. Further, the pulse generators 133 and 134 correspond to a timer, and a width of 1 bit, set in advance, is the shortest period of the OFF state for the switches Tr1 and Tr2.

<1-3. Transmitter Operation>

Figure 3:
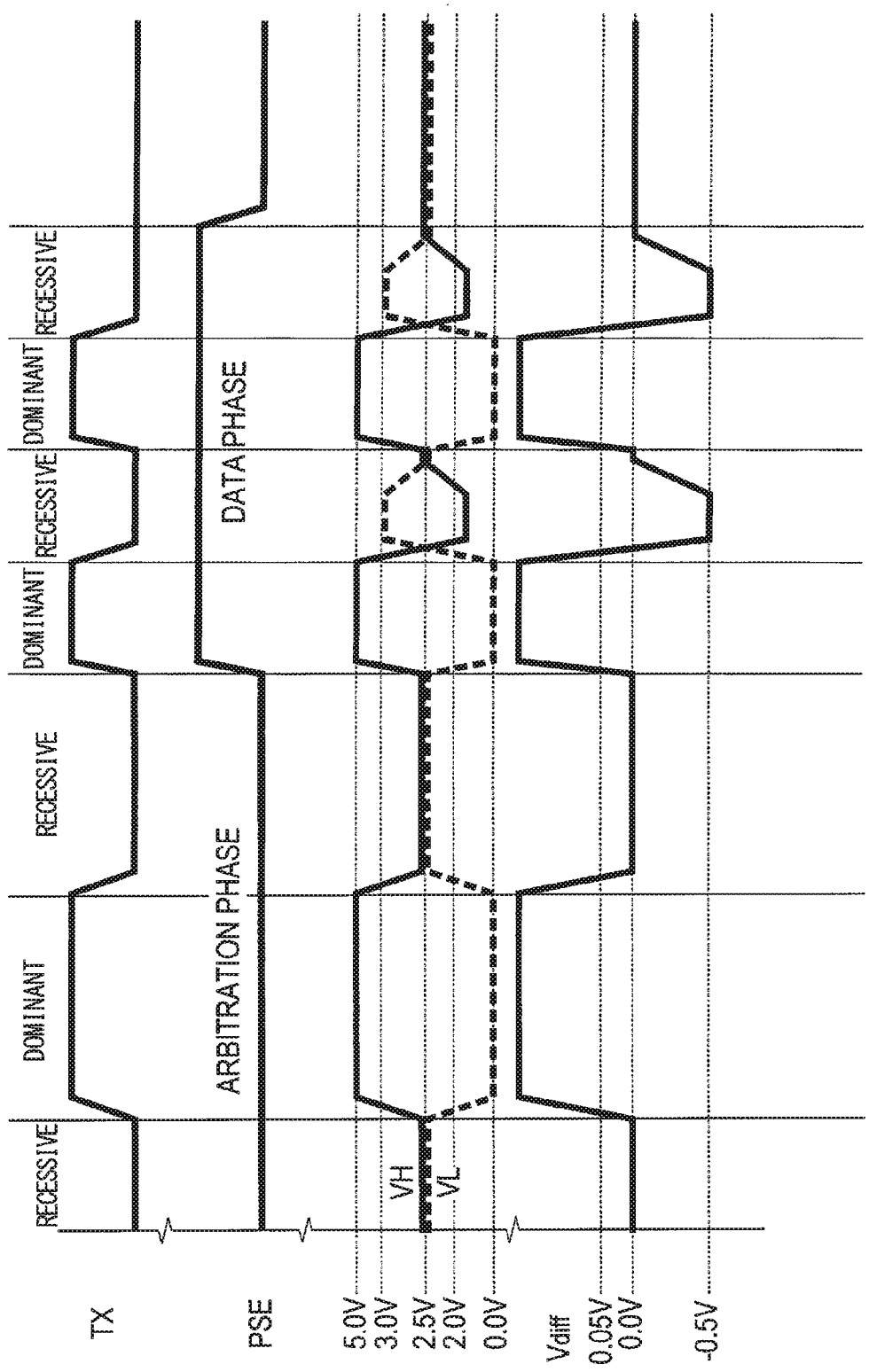
FIG. 3 illustrates a timing diagram of a transmission signal, a phase, a potential of a first signal line, a potential of a second signal line, and a differential signal.

Next, the operation of the transmitter 130 is described with reference to FIG. 3.

In a dominant period of the arbitration phase, i.e., as determined by the TX signal, the switches Tr1 and Tr2 are set to the ON state and the switches Tr3 and Tr4 are set to the OFF state, and the potential VH of the signal line 11 is set to 5 V, and the potential VL of the signal line 12 is set to 0 V. Therefore, the differential signal Vdiff takes a waveform of a positive potential difference.

In the recessive period of the arbitration phase, i.e., as determined by the TX signal, the switches Tr1-Tr4 are all set to the OFF state, and the potentials VH and VL of the signal lines 11 and 12 are all set to 2.5 V. Therefore, the differential signal voltage Vdiff has a waveform of a zero potential difference, i.e., 0V.

Note that a voltage drop of the switches Tr1-Tr4 and of the diodes D1-D4 is not taken into consideration, for the ease of description.

On the other hand, in the dominant period of the data phase, i.e., as determined by the TX signal, just like the dominant period of the arbitration phase, the switches Tr1 and Tr2 are set to the ON state and the switches Tr3 and Tr4 are set to the OFF state, and the potential VH is set to 5 V, and the potential VL is set to 0 V.

Figure 4:
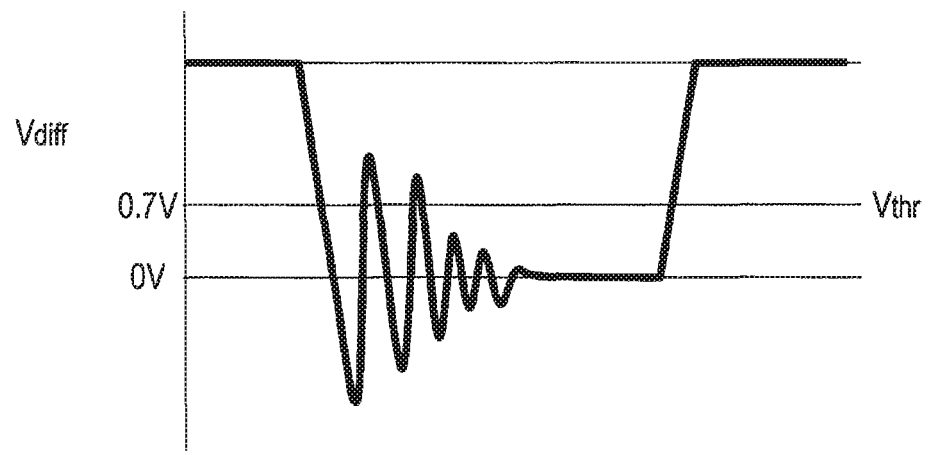
FIG. 4 illustrates a waveform diagram of a differential signal without an application of a reverse bias.

When the switches Tr1 and Tr2 switch from the ON state to the OFF state, the bus 10 is put into a high impedance state, and ringing occurs in the differential signal voltage Vdiff, as shown in FIG. 4. When the ringing occurs, the differential signal voltage Vdiff, which should otherwise be smaller than the threshold voltage Vthr, may exceed the threshold voltage Vthr.

In the arbitration phase, when the bit rate is low, the time to determine a level of the differential signal voltage Vdiff may be longer than the duration of the ringing, such that when ringing occurs during the arbitration phase, a stable signal level of the differential signal voltage Vdiff may be determined.

However, in the data phase, when the bit rate is high, the time to determine a level of the differential signal voltage Vdiff is shorter and more comparable to the duration of the ringing, such that when ringing occurs, the signal level may be unstable, making a determination of the differential signal voltage Vdiff difficult.

In the recessive period of the data phase, the switches Tr1 and Tr2 are set to the OFF state and the switches Tr3 and Tr4 are set to the ON state, and the potential VL of the signal line 12 is set to be higher than the potential VH of the signal line 11.

Figure 5:
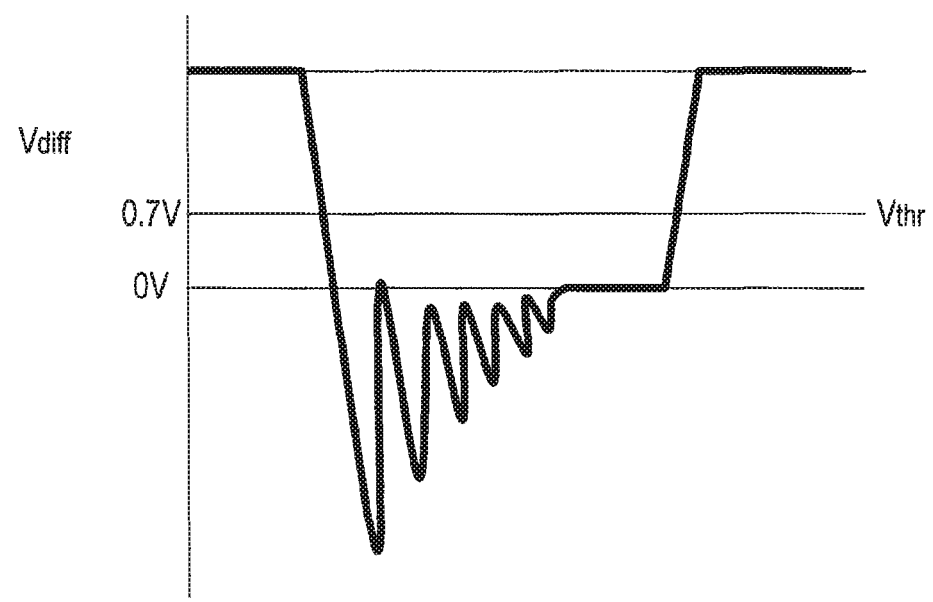
FIG. 5 illustrates a waveform diagram of a differential signal during a recessive period with an application of a reverse bias.

That is, in the data phase, by defining that a voltage application state of the bus 10 in the dominant period is a positive bias state, the bus 10 is put in a reverse bias state in the recessive period. In such manner, as shown in FIG. 5, the waveform of the differential signal voltage Vdiff is reversely biased, and thereby the differential signal voltage Vdiff is prevented from exceeding the threshold voltage Vthr when ringing occurs.

Applying the reverse bias to the bus 10 during the recessive period of the data phase causes a drive current to flow in the bus 10, which causes an increased power consumption in comparison to having the switches Tr1-Tr4 in the OFF state. That is, for example, when a drive capacity of the switches Tr3 and Tr4 is maximized and the reverse bias of −5 V is applied to the bus 10 during an entire recessive period, the power consumption in the recessive period may be substantially equal to that of the dominant period.

Thus, by adjusting the waveform of the differential signal voltage Vdiff, as described above, power consumption may be reduced without sacrificing a stable signal level determination.

<1-4. Waveform Adjustment of the Differential Signal>

The waveform of the differential signal Vdiff may be adjusted by the drivers DL2 and DH2.

Figure 6:
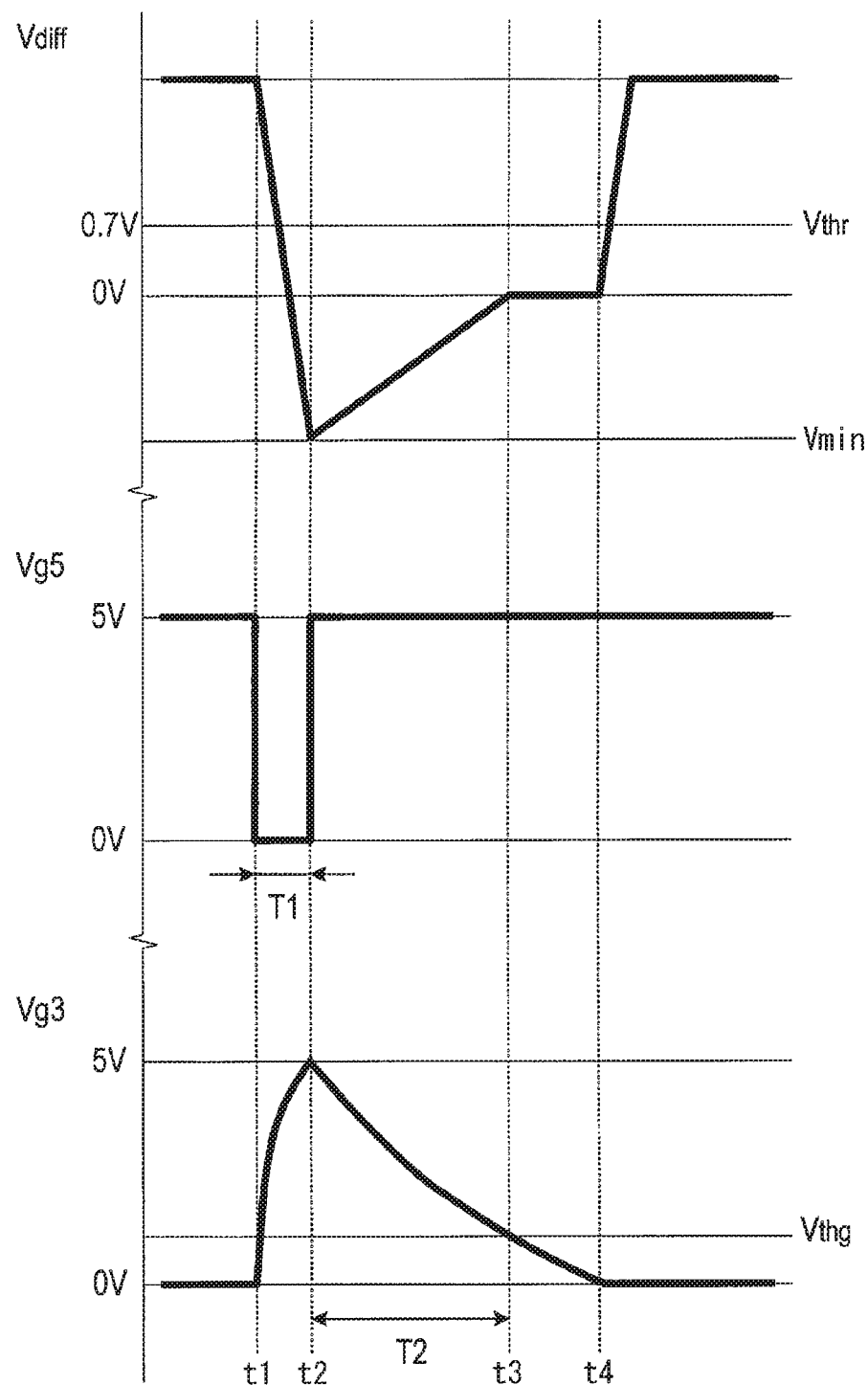
FIG. 6 illustrates a waveform diagram of a differential signal in a recessive period, a gate voltage of a driver switch, and a gate voltage of a reverse bias switch according to the first embodiment of the present disclosure.

FIG. 6 shows three waveforms, i.e., a waveform of the differential signal voltage Vdiff, a waveform of a gate voltage Vg5 of the switch Tr5, and a waveform of a gate voltage Vg3 of the switch Tr3.

The operation of the driver DH2 is inversely symmetric to the driver DL2. Although not illustrated, a waveform of a gate voltage Vg6 of the switch Tr6 and a waveform of a gate voltage Vg4 of the switch Tr4 respectively take a reflected form, i.e., an upside-down or flipped form, of the Vg5 and Vg3 waveforms shown in FIG. 6.

Note that, even though the following description is only about the adjustment of the waveform of the differential signal voltage Vdiff by the driver DL2, the configuration and operation of the driver DH2 are inversely related to, and may be inversely extrapolated from the configuration and operation of the driver DL2.

Figure 7:
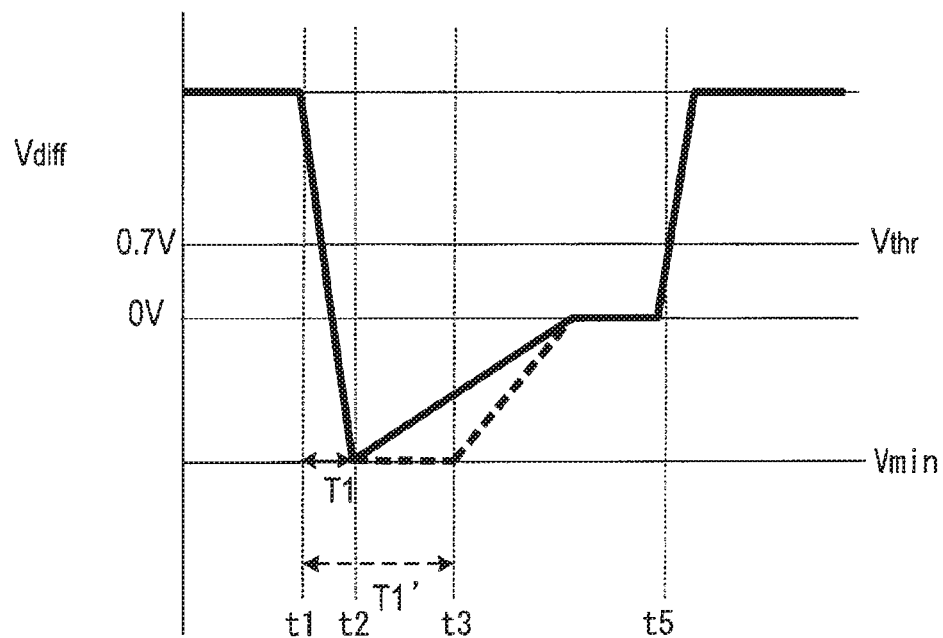
FIG. 7 illustrates a waveform diagram of a differential signal at a time of changing an ON time of a reverse bias switch.

FIG. 7 illustrates how an adjustment to pulse width (i.e., time of the pulse) may be used to adjust the differential signal Vdiff. The time (i.e. pulse width) of the pulse which is output from the pulse generator 133 is equal to an ON period of the switch Tr5, which is also equal to an ON period T1 of the switch Tr3, shown as the period from t1 to t2 in FIG. 6. Therefore, when the pulse width of a pulse is increased from T1 to T1', as shown in FIG. 7, the ON period extends (i.e., becomes longer) from T1, between the period of t1 to t2, to T1', between the period of t1 to t3. By increasing the pulse width to a period of T1', a duration of the minimum value of the differential signal Vmin becomes longer, shown as the period from t2 to t3 in FIG. 7.

That is, when the pulse width of a pulse is increased, the duration of a minimum value Vmin of the differential signal voltage Vdiff becomes longer.

The ringing occurs immediately after the switching of the switches Tr1 and Tr2 from the ON state to the OFF state, i.e., immediately after t1 in FIGS. 6 and 7, and the ringing attenuates in a short period of time. Therefore, it is not necessary to leave the switch Tr3 in the ON state for the total time switches Tr1 and Tr2 are in an OFF state, the OFF time of switches Tr1 and Tr2 shown as the period from t1 to t4 in FIG. 6, and the period from t1 to t5 in FIG. 7 (i.e., ON state of Tr3 for an entire 1-bit pulse width not required).

Thus, the driver DL2 drives the switch Tr3 so that the ON period T1 becomes shorter (i.e. from t1 to t2 in FIG. 6) than the 1-bit width period (i.e. from t1 to t4 in FIG. 6). That is, the pulse generator 133 outputs a pulse having a pulse width that is shorter than the 1-bit width. In such manner, the ON period T1 is adjusted to a shorter period that is shorter than the 1-bit width, and the power consumption is reduced.

Further, since the ringing attenuates gradually, the magnitude of the differential signal voltage Vdiff is prevented from exceeding the threshold Vthr by gradually bringing the differential signal Vdiff close to zero from the minimum value Vmin, as shown in FIG. 6 from t2 to t3 and by the solid line after t2 and dashed line after t3 in FIG. 7, even when the ON period is shortened to a length such as T1, as described above.

The driver DL2 is provided with the RC parallel circuit with the resistor Ra and the capacitor Ca that drives the switch Tr3 after switch Tr3 has been turned OFF so that the magnitude of the differential signal voltage Vdiff gradually approaches zero.

When the switch Tr3 is switched from the ON state to the OFF state, the electric charge accumulated in the capacitor Ca flows to the resistor Ra, and is consumed therein. The discharge of the capacitor Ca continues to drive switch Tr3 with the gate voltage Vg3 falling gradually and the drive capacity of the switch Tr3 lowering gradually over the period of T2, as shown from the period of t2 to t3 in FIG. 6. As a result, the magnitude of the differential signal Vdiff decreases gradually as the differential voltage moves from Vmin toward 0 V, as shown from t2 to t3 in FIG. 6. Further, when the gate voltage Vg3 is equal to or smaller than the threshold voltage Vthg, i.e. at t3 and beyond in FIG. 6, the discharge of the capacitor Ca no longer drives switch Tr3 and switch Tr3 is turned completely OFF, and the differential signal Vdiff becomes zero.

Figure 8:
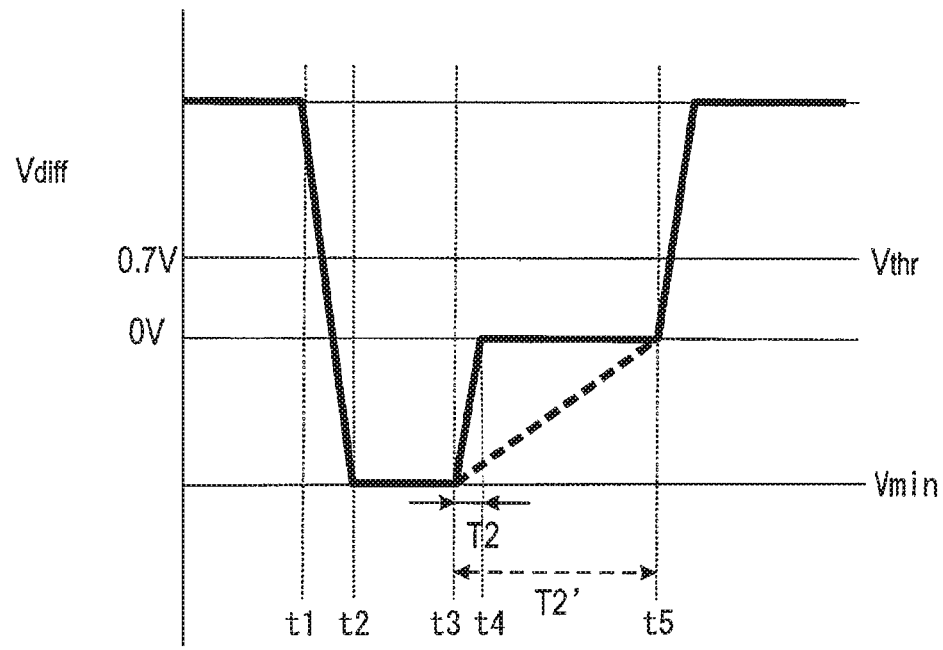
FIG. 8 illustrates a waveform diagram of a differential signal at a time of changing a half ON time of a reverse bias switch.

FIG. 8 illustrates how an adjustment of the resistance values of resistor Ra and/or of the capacitance values of capacitor Ca changes the differential signal waveform Vdiff. That is, when a resistance value of the resistor Ra and/or a capacitance value of the capacitor Ca are changed, a "semi-ON" period of the switch Tr3 changes as shown by a dashed line in FIG. 8. The "semi-ON" period, shown as T2 in FIG. 6 and as T2 and T2' in FIG. 8, of the switch Tr3 is the period where the switch Tr3 is turned off and the capacitor Ca is discharged to drive the switch Tr3. In FIG. 8, a pulse width adjustment is used to increase the minimum differential voltage value Vmin by applying a pulse over the period of t1 to t3. After the pulse is applied to switch Tr5, both switches Tr5 and Tr3 are turned to the OFF state at t3 in FIG. 8, whereby Tr3 enters into a semi-ON state where Tr3 is driven by the discharge of capacitor Ca. Discharge of the capacitor is governed by the RC time constant, i.e., Tau=RC, such that the discharge time of the capacitor may be varied by varying the resistance value of the resistor Ra and the capacitance value of the capacitor Ca. For example, a fast discharge of the capacitor Ca is shown for the period T2 from t3 to t4 in FIG. 8, while a slow discharge of capacitor Ca is shown by the period T2', i.e. the dashed line, from t3 to t5.

The ringing generation period may change depending on the number of ECUs 100 connected to the bus 10, or by other factors. Therefore, depending on the configuration of the communication system, the ON period T1 and the "semi-ON" period T2 are set to suitable values by adjusting the width (time) of the pulse generated by the pulse generator 133, the resistance value of the resistor Ra, and the capacitance value of the capacitor.

<1-5. Effects>

According to the first embodiment described above, the following exemplary effects are achieved.

In addition to preventing the differential signal Vdiff from exceeding the threshold Vthr, the power consumption of the transmitter 130 and thus ECU 100 is reduced in the recessive period of the data phase, by an application of the reverse bias to the bus 10 for a period shorter than the 1-bit width.

In the recessive period of the data phase, after an application of the reverse bias to the bus 10, by gradually bringing the differential signal voltage Vdiff to zero from a minimum voltage value Vmin, the ON period of the switches Tr3 and Tr4 is shortened further, and the power consumption by the transmitter 130 and thus ECU 100 is further reduced.

The drivers DL2 and DH2 are provided with RC parallel circuits, and the respective junction points between the switches Tr5, Tr6, and the respective RC parallel circuits are connected to the respective gate terminal of the switches Tr3 and Tr4. Thereby, the drive capacity of the switches Tr3 and Tr4 is gradually lowered, and the differential signal voltage Vdiff is gradually brought close to zero. By gradually bringing the differential signal voltage Vdiff to 0 V, ringing is eliminated, power consumption is reduced, and a smooth transition of differential communication between the recessive and dominant states is achieved.

The ON period T1 of the switches Tr3 and Tr4 is adjustable based on the pulse width of the pulse generated by the pulse generator 133 or 134, the transmission signal TX, and the phase PSE.

Second Embodiment

<2-1. Difference from the First Embodiment>

Since the basic configuration in the second embodiment is the same as that of the first embodiment, the following description focuses on the difference between the first and second embodiments. Note that the same numerals are assigned to the same configurations in both of the first and second embodiments for the brevity of description.

According to the second embodiment, the drivers DL2A and DH2A for driving the switches Tr3 and Tr4 are different from the drivers DL2 and DH2 of the first embodiment.

Figure 9:
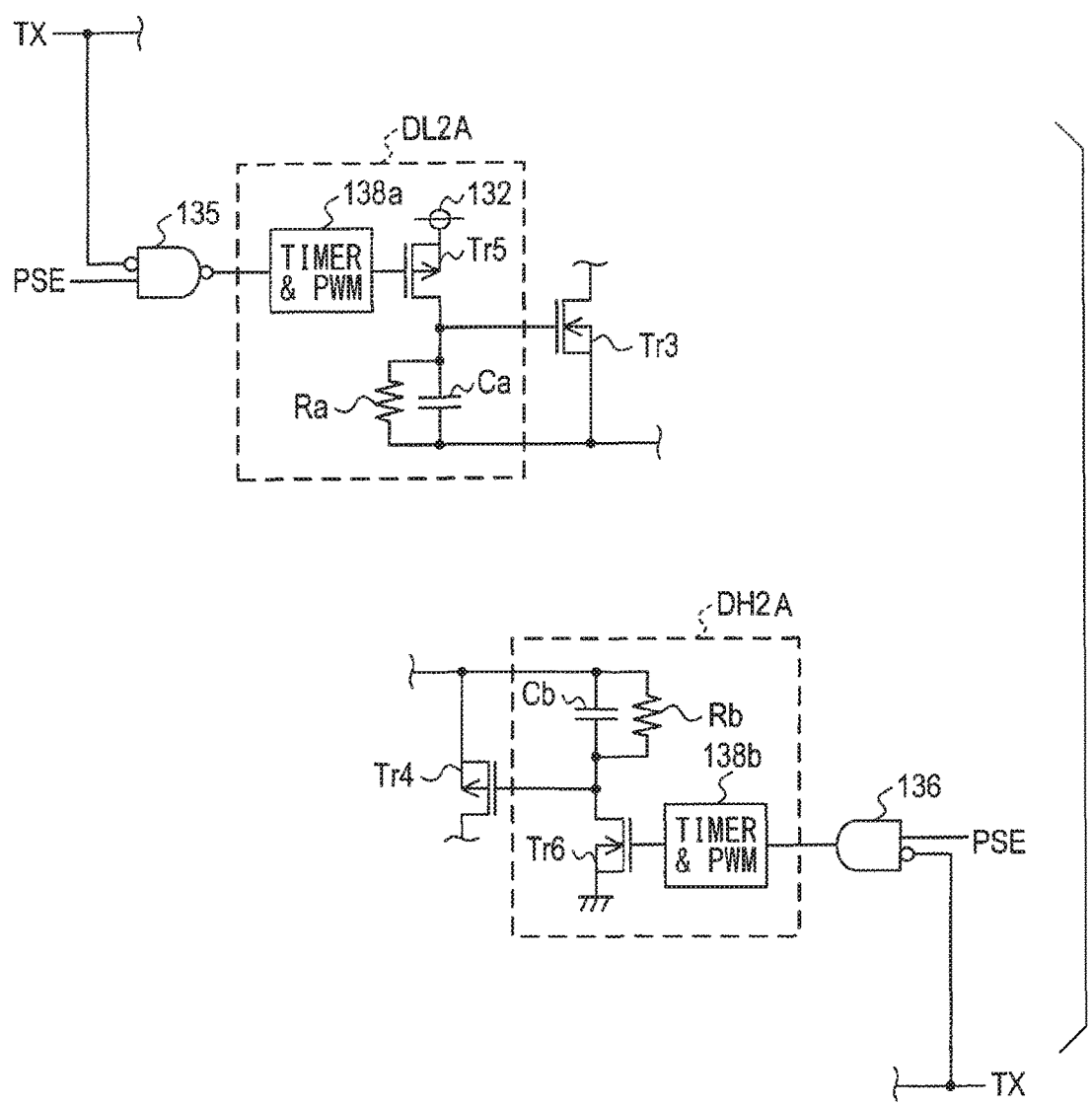
FIG. 9 illustrates a configuration diagram of a driver included in a transmitter according to a second embodiment of the present disclosure.

As shown in FIG. 9, signal generators 138a and 138b acts as timers and are used for the drivers DL2A and DH2A, replacing the pulse generators 133 and 134 used for the drivers DL2 and DH2 in the first embodiment, for example, to generate one or more pulses.

For example, the signal generator 138a continues to generate, for a predetermined generation period from an output of the L level of the logic circuit 135, a pulse width modulation signal (used herein as a PWM signal). That is, the signal generator 138a generates a PWM signal from the transmission signal TX and the phase PSE.

The signal generator 138a applies 5 V to the gate terminal of the switch Tr5, when the output of the logic circuit 135 is in the H level, and generates a PWM signal and applies the generated PWM signal to the gate terminal of the switch Tr5 when the output of the logic circuit 135 is in the L level.

<2-2. Waveform Adjustment of the Differential Signal>

Adjustment of the waveform of the differential signal voltage Vdiff by a driver, for example driver DL2A described above, in the recessive period of the data phase is described.

Figure 10:
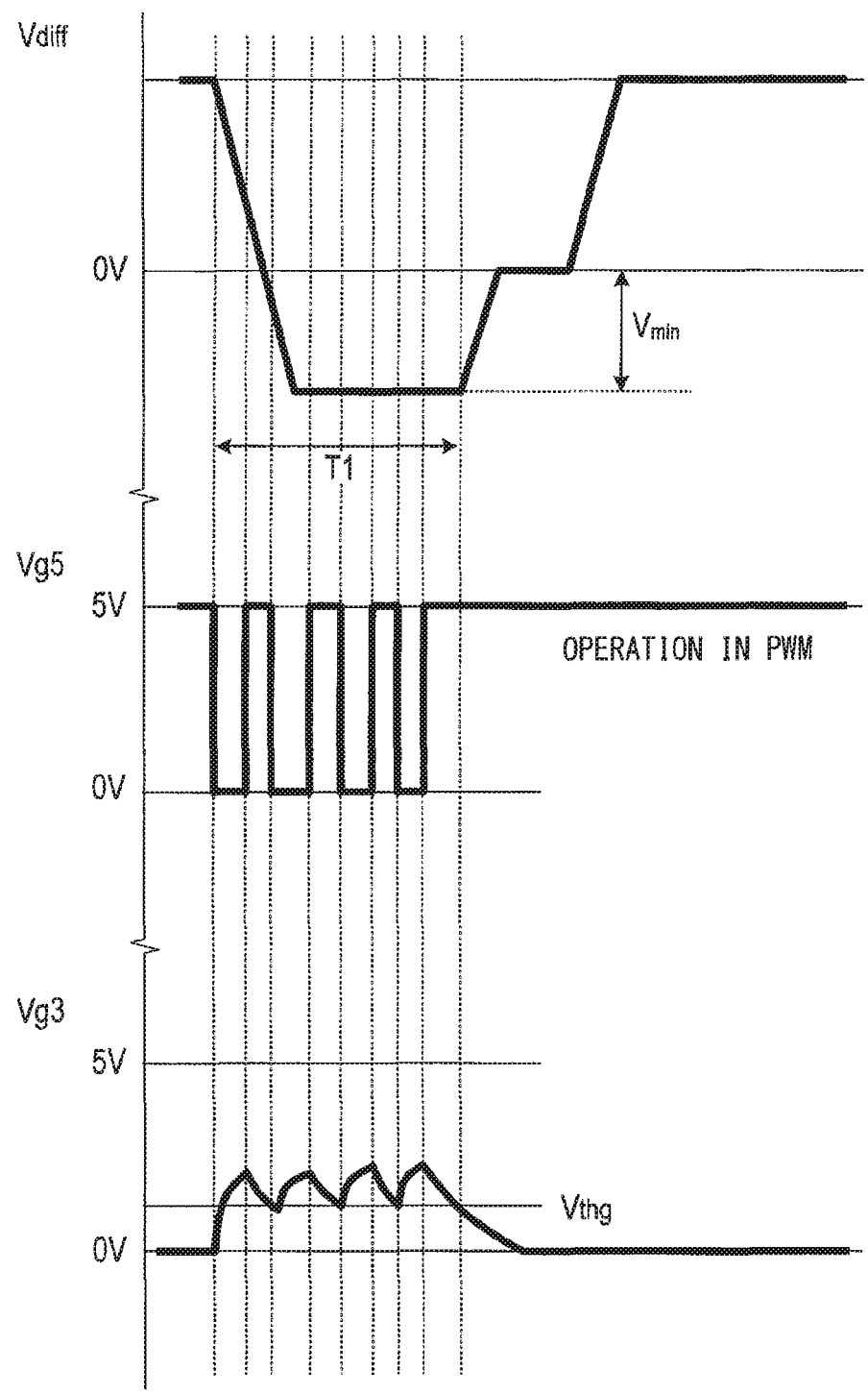
FIG. 10 illustrates a waveform diagram of a differential signal in a recessive period, a gate voltage of a driver switch, and a gate voltage of a reverse bias switch according to a second embodiment of the present disclosure.

FIG. 10 shows a waveform of the differential signal Vdiff and the gate voltage Vg5, and the gate voltage Vg3 in the second embodiment.

Similar the first embodiment, the waveform of the gate voltages Vg6 and Vg4 would be reflected, i.e. upside-down, forms of the respective waveforms of the gate voltages Vg5 and Vg3, shown in FIG. 10. For example, the waveform for gate voltage Vg6 would be a reflected waveform for gate voltage Vg5. Further, the driver DH2A and the driver DL2A have inversely symmetrical configurations and operate inversely symmetrical to each other.

As shown in FIG. 10, when a PWM signal is input to the gate terminal of the switch Tr5, i.e. during period T1, the PWM signal is smoothed by the RC parallel circuit, and the smoothed signal is input to the gate terminal of the switch Tr3.

Figures 11, 12:
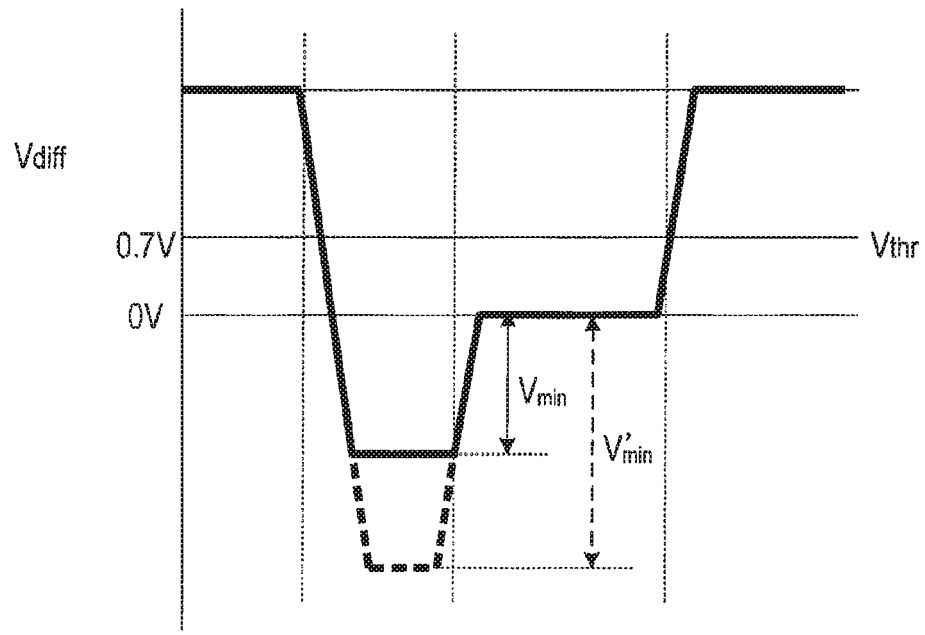
FIG. 11 illustrates a waveform diagram of a differential signal at a time of changing a drive capacity of a reverse bias switch.
FIG. 12 illustrates a CAN protocol standard.

Therefore, when the duty ratio of the PWM signal is raised, the drive capacity of the switch Tr3 is raised, as shown in FIG. 11 by a dashed line, and the magnitude of the differential signal voltage Vdiff increases.

That is, when the duty ratio of the PWM signal is raised, the magnitude of the minimum value of the differential signal Vdiff increases from Vmin to Vmin', and the power consumption also increases.

Thus, the driver DL2A drives the switch Tr3 so that the magnitude of the minimum value Vmin becomes smaller than the magnitude of the maximum value of the differential signal Vdiff in the ON state of the switches Tr1 and Tr2.

Further, as shown in FIG. 10, the generation period of the PWM signal is set to the ON period T1 of the switch Tr3.

When the generation period of the PWM signal is extended, the ON period T1 becomes longer and the duration of the minimum value Vmin of the differential signal Vdiff becomes longer.

Therefore, the driver DL2A adjusts the generation period of the PWM signal for driving the switch Tr3 so that the ON period T1 becomes shorter than the 1-bit width.

The ON period T1 and the minimum value Vmin of the differential signal Vdiff are set according to the configuration of the communication system, and the generation period and the duty ratio of the PWM signal are set so that the ON period T1 and the minimum value Vmin of the differential signal Vdiff set in the above are achieved.

FIG. 12 shows a CAN protocol standard in the recessive period of the data phase. In the present embodiment, for the differential signal Vdiff, the minimum voltage value Vmin is set to a value that is equal to or greater than –0.5 V and equal to or smaller than 0.05 V to fulfill the standard of the CAN protocol. Further, the resistance value of the resistor Ra and the capacitance value of the capacitor Ca are set to a value that appropriately enables a smoothing of the PWM signal.

<2-3. Effects>

According to the second embodiment described above, in addition to the exemplary effects of the first embodiment described above, the following exemplary effects are also obtained.

The power consumption of the ECU 100 is reduced by restricting the drive capacity of the switches Tr3 and Tr4 and controlling the magnitude of the minimum voltage value Vmin of the differential signal voltage Vdiff to be smaller than the maximum value of the differential signal voltage Vdiff in the ON period of the switches Tr1 and Tr2, when Tr1 and Tr2 are in the ON state.

During the recessive period of the data phase, CAN protocol standards are maintained by controlling the minimum voltage value Vmin of the differential signal to have a value that is equal to or greater than –0.5 V and equal to or smaller than 0.05 V.

The ON period T1 of the switches Tr3 and Tr4 is adjusted by controlling the generation period of the PWM signal.

By adjusting the duty ratio of the PMW signal, the drive capacity of the switches Tr3 and Tr4 is adjusted, thereby enabling the minimum voltage value Vmin of the differential signal voltage Vdiff to be set to a desired value.

Other Embodiments

Although the embodiments for implementing the present disclosure are described above, the form of implementation is not limited to such embodiments, as long as the gist of the modified implementation falls within the scope of the present disclosure.

In the first embodiment described above, the ON period T1 may be adjusted without adjusting the half ON period T2.

In such case, the drivers DL2 and DH2 may not have to have the RC parallel circuit, and each of the switches may not be implemented as a transistor.

The first and second embodiments may be combined, and the ON period T1, the half ON period T2, and the minimum voltage value Vmin of the differential signal voltage Vdiff may all be adjusted. In such case, the resistance value and the capacitance value of the RC parallel circuit may be set by using the drivers DL2A and DH2A to achieve a desired half ON period T2.

The drivers DL2 and DH2 may have any circuit configuration as long as they are capable of adjusting the ON period T1 and the half ON period T2. Further, the drivers DL2A and DH2A may have any circuit configuration as long as they are capable of adjusting the ON period T1 and the minimum voltage value Vmin of the differential voltage signal Vdiff.

The transmitter 130 of the above-mentioned embodiments may be applied to any differential communication according to a communication standard other than the CAN protocol. For example, the transmitter 130 concerning each of the above-mentioned embodiments can be applied to a communication which transmits a differential signal that switches the H level and the L level during a 1-bit period. In such case, the ON period T1 can be set up as a period that is shorter than the shortest OFF period among the OFF state periods of the switches Tr1 and Tr2. The OFF state periods of the switches Tr1 and Tr2 are configured prior to the operation of ECU 100.

In each of the above-mentioned embodiments, a differential communication circuit may be implemented as the transceiver 120 including the transmitter 130 and the receiver 140.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Such changes, modifications, and summarized schemes are to be understood as being within the scope of the present disclosure as defined by appended claims.

What is claimed is:

1. A differential communication circuit configured to switch a potential of a first signal line and a second signal line as a pair of signal lines according to a transmission signal to generate a first potential difference between the first signal line and the second signal line, the differential communication circuit comprising:
a first switch disposed at a position between the first signal line and a first potential;
a second switch disposed at a position between the second signal line and a second potential, the second potential set to be lower than the first potential;
a third switch disposed at a position between the first signal line and the second potential;
a fourth switch disposed at a position between the second signal line and the first potential;
a first main driver circuit configured to drive the first switch;
a second main driver circuit configured to drive the second switch;

a first sub-driver circuit configured to drive the fourth switch, wherein the fourth switch is configured to be driven from an OFF state to an ON state based on a drive state of the second switch, and wherein an ON period of the fourth switch is set to be shorter than a preset shortest OFF period of the second switch; and a second sub-driver circuit configured to drive the third switch, wherein the third switch is configured to be driven from an OFF state to an ON state based on a drive state of the first switch, and wherein an ON period of the third switch is set to be shorter than a preset shortest OFF period of the first switch.

2. The differential communication circuit of claim 1, wherein
the third switch and the fourth switch are a transistor.

3. The differential communication circuit of claim 2, wherein
the first sub-driver circuit configured to drive the fourth switch and the second sub-driver circuit configured to drive the third switch are configured to generate a second potential difference between the first signal line and the second signal line, wherein a magnitude of the second potential difference is smaller than a magnitude of the first potential difference.

4. The differential communication circuit of claim 2, wherein
the first sub-driver circuit configured to drive the fourth switch and the second sub-driver circuit configured to drive the third switch are configured to generate a second potential difference between the first signal line and the second signal line, wherein a magnitude of the second potential difference gradually approaches zero.

5. The differential communication circuit of claim 3, wherein
the first and second sub-driver circuits are configured to control the magnitude of the second potential difference to be equal to or smaller than 0.5 V.

6. The differential communication circuit of claim 1, wherein
the first sub-driver circuit is configured to adjust the ON period of the fourth switch using a timer that receives the transmission signal as an input, and wherein the second sub-driver circuit is configured to adjust the ON period of the third switch by using a timer that receives the transmission signal (TX) as an input.

7. The differential communication circuit of claim 3, wherein
the first sub-driver circuit is configured to generate a first pulse width modulation (PWM) signal based on the transmission signal, to smooth the first PWM signal, and to input the first PWM signal into the fourth switch, and wherein
the second sub-driver circuit is configured to generate a second pulse width modulation (PWM) signal based on the transmission signal, to smooth the second PWM signal, and to input the second PWM signal into the third switch, and
a duty ratio of the first PWM signal is set to a target magnitude based on a drive capacity of the fourth switch, and a duty ratio of the second PWM signal is set to a target magnitude based on a drive capacity of the third switch, so that the first and second PWM signals control the magnitude of the second potential difference.

8. The differential communication circuit of claim 2, wherein
the first sub-driver circuit includes a first parallel circuit of a first resistor and a first capacitor, a first sub-switch that is connected in series to the first parallel circuit, and a first control terminal connected to a junction point between the first sub-switch and the first parallel circuit, and wherein
the second sub-driver circuit includes a second parallel circuit of a second resistor and a second capacitor, a second sub-switch that is connected in series to the second parallel circuit, and a second control terminal connected to a junction point between the second sub-switch and the second parallel circuit, and wherein
the third and fourth switches are a voltage-control type transistor.

9. The differential communication circuit of claim 1 further comprising:
a reception circuit configured to receive the transmission signal.

* * * * *